March 3, 1931.  W. K. HOWE  1,794,620
SWITCH MACHINE
Filed June 14, 1929
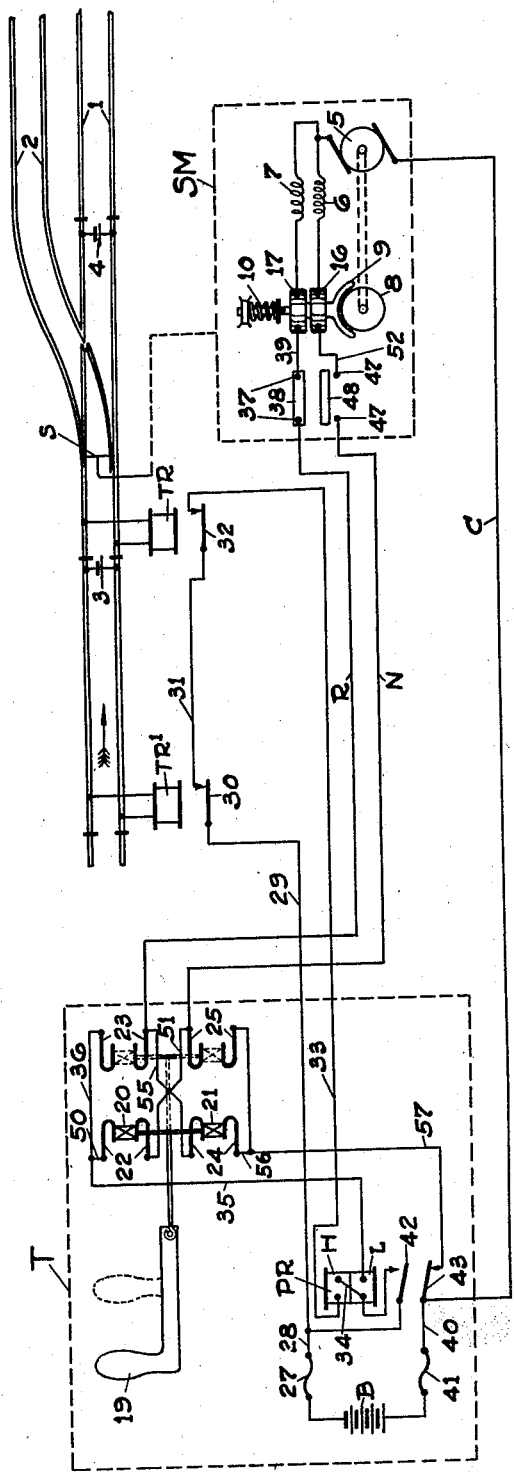
INVENTOR
W. K. Howe,
BY Neil C. Preston,
ATTORNEY Patented Mar. 3, 1931

1,794,620

UNITED STATES PATENT OFFICE

WINTHROP K. HOWE, OF ROCHESTER, NEW YORK, ASSIGNOR TO GENERAL RAILWAY SIGNAL COMPANY, OF ROCHESTER, NEW YORK

SWITCH MACHINE

Application filed June 14, 1929. Serial No. 370,906.

This invention relates to traffic controlling devices of railways, and more particularly to the apparatus and circuits for operating a distant track switch from a local tower.

In the provision of means for operating track switches of railway systems, it is highly important to employ apparatus and circuits for controlling the same, which are protected against operation of such track switches by the application of current from some foreign or unauthorized source, by reason of crosses, grounds, or the like.

In accordance with the present invention it is proposed to operate a distant track switch by a switch machine of the electric motor type, and to guard against operation of such switch machine by unauthorized current by the employment of an electro-magnetic brake which will prevent operation of the motor so long as the motor torque is below a predetermined value, this electro-magnetic brake being so connected in the system that the application of current to both the normal and the reverse wire will maintain the brake applied irrespective of the amount of current flowing through the motor, this being decidedly important in the event there is a cross between the normal and the reverse wire in that such cross otherwise might cause unauthorized operation of the motor.

Other objects of the present invention reside in the provision of means for permitting reversal of the switch machine when stalled in midstroke, the provision of means for preventing operation of the switch machine under certain traffic conditions but to permit such operation in the event such traffic conditions exist after the switch machine operation has been initiated.

Other objects, purposes, and characteristic features of the invention will in part be obvious from the accompanying drawing and in part be described hereinafter.

In describing the invention in detail reference will be made to the accompanying drawing, in which the dotted rectangle represents a tower housing the apparatus at the local point, and the remaining apparatus is that located at a distant trackway location.

Referring to the drawing, the main track has been represented by track rails 1, which are connected to the track rails 2 of a passing siding, through the medium of a track switch S, this track switch S being operated by a switch machine SM. The track switch S has associated therewith the usual detector track circuit including the track relay TR and the track battery 4. Similarly, there is an approach track section having a track circuit including a track relay $TR^1$ and a track battery 3. This switch machine SM includes a reversible motor of the double field winding type, including an armature 5, a normal field winding 6 for operating the switch machine in a direction to place the track switch S in its main track position, and a reversing field winding 7. This motor has associated therewith a brake drum 8 adapted to be engaged by the brake shoe 9. This brake shoe 9 is urged against the brake drum 8 by a compression spring 10, an electromagnet comprising windings 16 and 17 being employed to release the spring operated brake 8—9. Attention is directed to the fact that these windings 16 and 17 are connected in series with field windings 6 and 7, respectively, and that the brake windings 16 and 17 are wound in opposite directions with respect to current flow from left to right in their circuits. This arrangement of the windings 16 and 17 is an important feature of the electromagnetic brake, in that should a cross occur between the normal and reverse wires N and R, to permit flow of current in both the windings 16 and 17, their effects would be neutralized and the brake 8—9 would not be released.

In the local tower T is provided the usual switch machine control lever 19, which may or may not be interlocked with other levers depending upon the type of system of which the switch machine SM forms a part. This lever 19 through the medium of movable contacts 20 and 21, adapted to engage stationary contacts 22, 23, 24, and 25 may control the distant switch machine SM. Associated with this lever 19 is a protection relay PR, having a high resistance winding H and a low resistance winding L. It is believed that the structure of the system and its operating features will be best understood by considering the operation of the system.

*Operation.*—Attention is directed to the fact that the track switch S is now in its normal position, as is also the switch machine SM controlling the same, and similarly, the lever 19 is in its normal position. Let us assume that the operator in the tower T wishes to operate the track switch S to the reverse or take-siding position. To accomplish this he will move his lever 19 to the dotted position, and if the track relay TR is in its normal energized position as is also the track relay TR¹, the following circuit for the high resistance winding H of the protective relay PR is closed:—beginning at the positive terminal of the battery B, fuse 27, wires 28 and 29, contact 30 of the relay TR¹, wire 31, contact 32 of the relay TR, wire 33, high resistance winding H of the relay PR, wire 34, low resistance winding L of the relay PR, wires 35 and 36, contacts 20—23, reverse wire R, contacts 37—38, wire 39, winding 17 of the electro-magnetic brake 8—9, field winding 7, armature 5, common return wire C, wire 40, fuse 41, back to the negative terminal of the battery B.

The circuit just traced will not effect operation of the switch machine, because the resistance of the winding H is so high that very little current flows in this circuit. The flow of current in the circuit just traced, will however effect energization of the protective relay PR, thereby effecting closure of its contact 42, and opening if its contact 43. Closure of the contact 42 shunts the high resistance winding H and the increase of current flow in the circuit is sufficient to release the electro-magnetic brake 8—9 and operate the switch machine motor, this increased current flowing in the circuit being sufficient to maintain the contact 42 of the relay PR closed by reason of the current flow in the low resistance series winding L of this relay PR.

After a few revolutions of operation of the motor 5—7 the contacts 47—48 of the switch machine SM are closed; this construction is resorted to in order to permit reversal of the switch machine in midstroke if this should be required. Attention is directed to the fact that there is no flow of current through either the field winding 6 or the electro-magnetic brake winding 16, because the contact 43 of the relay PR is now open and prevents flow of current through these windings. The switch machine motor 5—7 will thus continue to operate until it has moved the switch S to the take-siding position, at which time the contacts 37—38 open and cut off the flow of current to the motor 5—7. It thus appears that the contacts 38—48, are contacts of the make-before-break type, in that both contacts 37—38 and 47—48 are closed at substantially all times except when the switch machine assumes an extreme position, this feature permitting reversal of the switch machine in mid-stroke. In this connection it may be pointed out that the switch machine SM is provided with suitable switch point or throw bar locking means, which is effective when the switch machine SM assumes either of its extreme positions, but such locking means may be omitted, if desired, since the electro-magnetic brake 8—9 affords locking which in some cases may be deemed adequate.

In substantially the same way as just explained return of the lever 19 to the normal position will close the following circuit for energizing the relay PR and then returning the switch machine SM to its normal position:—beginning at the positive terminal of the battery B, fuse 27, wires 28 and 29, contact 30, wire 31, contact 32, wire 33, winding H of the relay PR, wire 34, winding L of the relay PR, wires 35 and 50, contacts 20—22, wires 51 and N, contacts 47—48, wire 52, winding 16 of the electro-magnetic brake 8—9, field winding 6, armature 5, common return wire C, wire 40, fuse 41, back to the battery B. The completion of this circuit effects energization of the relay PR thereby closing contact 42 of this relay PR to allow sufficient current to flow in the circuit to operate the switch machine SM back to its normal position, at which point in the operation the contacts 47—48 are opened. It should be noted that in the event there is a train moving in the normal direction of traffic from left to right, as indicated by the arrow, its treading upon the track circuit will deenergize the track relay TR¹, but this de-energization of relay TR¹ will not stop operation of the switch machine at some intermediate point in its stroke, because the contact 42 of the protection relay PR has already shunted the winding H, this relay including in series therewith the contact 30 of the relay TR¹, so that the switch machine SM will continue its operation and complete its stroke before the train in question reaches the switch S. The track circuits containing track relays TR and TR¹ extend back a sufficient distance to prevent a train moving at its maximum speed reaching the track switch S before the switch machine SM has completed its stroke.

Let us now assume that the apparatus assumes its normal condition, as shown in the drawings, and that current is applied to the reverse wire R from a foreign source or from the same battery B through a circuit of another traffic controlling device. The application of current from the positive terminal of the battery B to the wire R, would not produce operation of the switch machine SM, because this current would find a more ready path through the following partial circuit:—beginning at the reverse wire R, wire 55, contacts 21—24, wires 56 and 57, back contact 43 of the protective relay PR, wire 40, fuse 41, to the negative terminal of the battery B, and this flow of current would presumably be of such high value that it would cause the fuse 41 to blow, thereby calling attention to the fact that there is something wrong which would be corrected by the maintainer. The application of current to the reverse wire R, as just explained, would also permit a small amount of current to flow through the switch machine motor 5—7, but this flow of current would be too small to cause operation of the switch machine SM by reason of the low resistance of the partial circuit just traced and in multiple therewith, and also the fuse 41 would probably blow very quickly so that the switch machine 5—7 would not be operated.

Let us now assume that a cross occurs between the wires N and R; with such a cross between wires N and R the following circuit through the switch machine SM would be closed:—beginning at the positive terminal of battery B, elements 27, 28, 29, 30, 31, 32, 33, H, 34, L, 35, 50, 20—22, 51, N, the unauthorized cross between wires N and R, contacts 37—38, wire 39, winding 17, field winding 7, armature 5, common return wire C, wire 40, fuse 41, to the battery B. Another branch circuit extending from wire R, through 55, 24, 21, 56, 57, 43, 40, 41 and back to battery B is completed, but this branch circuit is only closed momentarily, because the relay PR picks up immediately upon closure of the circuit through the switch machine motor. The closure of this circuit will energize the protective relay PR for reasons heretofore given thereby completing a circuit of comparatively low resistance for the switch machine motor 5—7. The flow of current in this low resistance circuit will allow the switch machine to operate a revolution or two, after which the contacts 47—48 of the make-before-break contacts 37—38 and 47—48 will close, thereby causing the current to divide between windings 16 and 17 of the electro-magnetic brake 8—9. Since these windings 16 and 17 buck each other, that is are wound in opposite directions, the electro-magnetic brake 8—9 will be applied, thereby preventing further operation of the switch machine SM. In this connection, attention is also directed to the fact that with the current divided, as just explained, the field windings 6 and 7 will substantially neutralize each other so that the flow of current in the armature 5 will produce very little torque, if any.

A control circuit for a switch machine has thus been provided, in which the lever 19 may be a two-position lever, and in which the false operation of the switch machine is guarded against by being protected by shunting circuits including the back contact 43 of the protective relay PR in the event that unauthorized current is applied to either the normal or the reverse wire; and in which the protective relay PR prevents operation of the switch machine SM in the event there is a train approaching in the approach section at the time that the lever is operated. The protective relay PR also permits the switch machine to complete its stroke in the event there is a train entering the approach section after operation of the switch machine has been initiated. The apparatus of the present invention also includes an electromagnetic brake containing windings which neutralize each other in the event current is applied to both of them at the same time, this arrangement preventing false operation of the switch machine in the event a cross occurred between the normal and reverse wires N and R.

Having thus shown and described one specific embodiment of the present invention, it is desired to be understood that the particular embodiment illustrated has been selected for the purpose of facilitating descriptions of its structure as well as its features of operation, more than with the intent of showing the exact construction preferably employed in practicing the same or the scope of the invention; and that various changes, modifications, and additions may be made to adapt the invention to the particular railway system or interlocking plant in connection with which the invention is to be used, all without departing from the spirit or scope of the invention or the idea of means underlying the same, except as demanded by the scope of the following claims.

What I claim as new is:—

1. A switch machine for operating distant track switches comprising, a throw rod, a reversible motor for operating said throw rod including an armature and two field windings so connected that if current is caused to flow through said armature and one of said field windings said armature will be operated in one direction and if current is caused to flow through said armature and said other field winding said armature is caused to operate in the other direction, and a spring actuated electro-magnetically released brake having two windings, one connected in series with one of said field windings and the other connected in series with the other field winding, the turns of the brake windings being so arranged that if both of said field windings are energized simultaneously said brake will not be released.

2. A switch machine for operating distant track switches comprising, a throw rod, a reversible motor for operating said throw rod including an armature and two field windings so connected that if current is caused to flow through said armature and one of said field windings said armature will be operated in one direction and if current is caused to flow through said armature and said other field winding said armature is caused to operate in the other direction, and a spring actuated electro-magnetically released brake having two windings, one connected in series with one of said field windings and the other connected in series with the other field winding, said brake windings having their turns so arranged and of such number that said brake will not be released if said armature is energized by current flowing through said field windings in multiple.

3. Cross-protection means for preventing operation of a switch machine for operating track switches in response to a cross-between the usual normal and reverse wire, in switch machines of the double field winding type comprising; a mechanical friction brake, spring means for normally holding said brake applied, and electro-magnetic means effective to release said brake if said motor is energized through either of said field windings but ineffective to release said brake if said motor is energized through both of its field windings.

4. Cross-protection means for preventing operation of a switch machine for operating track switches in response to a cross-between the usual normal and reverse wire comprising; a mechanical friction brake, spring means for normally holding said brake applied, and electro-magnetic means effective to release said brake if said motor is energized off of either said normal or said reverse wire but ineffective to release said brake if said motor is energized by receiving current from both the normal and the reverse wire simultaneously.

5. In a switch machine control circuit, the combination with a switch machine constructed to operate in one direction if potential is applied across its normal terminal and common wire, and to operate in the reverse direction if potential is applied across its reverse terminal and a common wire; and a normally active electro-magnetic brake, released automatically if said switch machine is energized in either of the ways above specified but not released if said normal and reverse wires are connected together and potential is applied between them and the common wire.

6. A switch machine for operating railway switches and a control circuit therefor comprising, apparatus including a reversible motor and two sets of contacts the normal set of which is open when the switch machine assumes the normal position, the reverse set of which is open when the switch machine assumes the reverse position and both sets of which are closed when the switch machine assumes an intermediate position; a normally de-energized and normally active electro-magnetic brake for said motor having two brake windings either of which if energized will render said brake inactive; a normal circuit for said motor including a normal wire, said normal set of contacts and one of said brake windings in series; a reverse circuit for said motor including a reverse wire, said reverse set of contacts and the other brake winding in series; said one and said other brake winding being so connected in their respective circuits that their fluxes will neutralize and said brake will be active if both of said circuits are closed simultaneously.

7. In combination, a switch machine operable in one direction over a normal circuit including a normal wire and a common wire and operable in the other direction over a reverse wire and said common wire, a lever for closing either said normal or said reverse circuit through a current source having one terminal connected to said common wire permanently, a protective relay having a high resistance and a low resistance winding connected in series and in series with said source and having a front contact for shunting said high resistance winding, and a back contact on said relay connecting the then disconnected normal or reverse wire to said common wire, whereby said back contact provides a shunt for said switch machine to prevent its operation by foreign current.

8. A switch machine comprising; a motor of the double field type wherein the two field windings are connected together and their junction is connected to the armature, the turns in said field windings being so arranged that if one terminal of a source is connected to the free brush of said armature and the other terminal of said source is connected to one free field causes operation of said motor in one direction, and if connected to the other free field terminal causes operation of said motor in the other direction; and a de-energized normally inactive electro-magnetic brake for said motor having two windings, one connected in series with one field winding and the other connected in series with the other field winding, with the turns so arranged that if current is applied simultaneously to both of said field windings the magnetic flux in said electro-magnetic brake is neutralized, and said brake is not released.

9. In a switch machine control circuit, the combination with a switch machine constructed to operate in one direction if potential is applied across its normal terminal and common wire, and to operate in the reverse direction if potential is applied across its reverse terminal and a common wire; and a normally active electro-magnetic brake, released automatically if said switch machine is energized in either of the ways above specified but not released if said normal and reverse wires are connected together and potential is applied between them and the common wire, a track relay, and means for preventing operation of said switch machine if such operation is initiated after said track relay is de-energized but permitting continuation of its operation until it has completed its operating stroke if said track relay is de-energized while said switch machine is operating.

10. In combination, a motor for operating the switch points of a track switch, a spring actuated brake for preventing rotation of said motor, a normal wire and a reverse wire for operating said motor in the normal and reverse direction respectively, two differentially wound coils for releasing said brake one coil of which is included in the normal wire and the other of which is included in the reverse wire, whereby if the normal and the reverse wires are simultaneously connected to a source of current said brake is not released but is released if either the normal or the reverse wire are so connected.

In testimony whereof I affix my signature.

WINTHROP K. HOWE.